United States Patent [19]

Wetterhorn et al.

[11] Patent Number: 4,753,112
[45] Date of Patent: Jun. 28, 1988

[54] CASE ASSEMBLY FOR GAUGE

[75] Inventors: Richard H. Wetterhorn, Fairfield; Walter J. Ferguson, Middlebury, both of Conn.

[73] Assignee: Dresser Industries, Inc., Dallas, Tex.

[21] Appl. No.: 23,342

[22] Filed: Mar. 9, 1987

[51] Int. Cl.⁴ ............................................. G01D 11/24
[52] U.S. Cl. ................................................. 73/431
[58] Field of Search ........................................ 73/431

[56] References Cited

U.S. PATENT DOCUMENTS

| 1,637,093 | 7/1927 | Tomlinson | 73/431 X |
| 3,187,582 | 6/1965 | Perkins et al. | 73/431 |
| 3,434,330 | 3/1969 | Ingham et al. | |
| 3,921,455 | 11/1975 | Staubli et al. | |
| 4,096,760 | 6/1978 | Billbert et al. | 73/738 |
| 4,175,444 | 11/1979 | Harland | 73/431 X |
| 4,192,193 | 3/1980 | Schnell | 73/739 |
| 4,459,848 | 7/1984 | Huret et al. | 73/431 |
| 4,545,256 | 10/1985 | Ferguson | 73/431 X |

OTHER PUBLICATIONS

Photographs 1-11; miscellaneous case mounted gauges; in public use by Dec. 1987.

Primary Examiner—Tom Noland

[57] ABSTRACT

A gauge (10) is disclosed which incorporates an improved case assembly. In one embodiment, a case (14) is designed for use with either a bayonet ring (22) or a friction fit ring such as an elastomeric ring (50) or a push in window (156). In the first embodiment, cam followers (28) are positioned in pockets (46) formed on the case (14) to orient the followers and the followers are then secured to the case, as by welding. Cam surfaces (32) on the bayonet ring (22) cooperate with the followers to secure the ring on the case. When using a friction fit ring (50, 150) the case defines an interior surface (44) to receive the ring. In a second embodiment, curved strips (132) are secured to the exterior surface of the case (130). Cam followers (140) are used on the bayonet ring (138) to cooperate with the cam surfaces on the curved strips to secure the ring to the case. Alternately, an elastomeric ring (50) or push in ring (152) can be used with the case (130).

13 Claims, 3 Drawing Sheets

CASE ASSEMBLY FOR GAUGE

TECHNICAL FIELD

This invention relates to a case assembly for mounting a gauge, such as a pressure gauge, having a visible indicator.

BACKGROUND ART

Gauges, such as fluid pressure gauges, have innumerable uses in industry. Price competition between the various gauge manufacturers is quite fierce. Therefore, a savings in the cost of material, labor and the like by a manufacturer can have a significant effect on that manufacturer's sales and profits. Therefore, a constant need exists among these manufacturers to develop more cost effective gauge manufacturing techniques.

The actual operating elements of the gauge are usually supported in a support structure. One of the most common support structures is a cylindrical case which supports the gauge within the case. A ring is mounted at one end of the case for supporting a transparent glass or window so that the gauge indicator can be seen. Two case types are commonly used. One type is called an open front case where the ring covers an opening in the case of essentially the same diameter as the case itself. The other type is a solid front case where the ring covers an opening in the case essentially just large enough to allow the indicator shaft to pass through without obstruction.

There are also two common types of rings used. The first type is known as a bayonet ring. The bayonet ring and case on which it is mounted have cooperating cam structures which secure the ring on the case by twisting the ring slightly relative to the case. The second type of ring is the sliding friction fit ring, which employs either a plastic member or an annular elastic member to frictionally engage the case.

To satisfy customer requirements, the typical gauge manufacturer has been required to maintain an inventory of four different cases, an open front case for receiving a friction fit ring, an open front case for receiving a bayonet ring, a solid front case for receiving a friction fit ring and a solid front gauge for receiving a bayonet ring. This inventory requirement is inefficient and costly.

SUMMARY OF THE INVENTION

In accordance with one aspect of the present invention, a case assembly is provided for a gauge having an indicator A front cover is mounted on the case assembly including a transparent material to protect the indicator and to allow the indicator to be observed. The front cover selectively has either a bayonet ring or a friction fit ring for mounting the front cover on the case assembly. The case assembly includes a case having an interior for receiving the gauge and defines a cylindrical exterior ring mounting surface and an interior ring mounting surface. The case has structure at the exterior ring mounting surface to orient a cam element both axially along the center line of the cylindrical exterior ring mounting surface and circumferentially about the surface to receive a cooperating cam element on a bayonet ring. The interior ring mounting surface is for receiving a friction fit ring. The case thereby can be used to mount either type of ring.

In accordance with other aspects of the present invention, the cam element on the case can comprise a cylindrical stud with the cam element on the ring comprising a cam surface. Alternatively, the cam element on the case can be a curved strip having a cam surface while the cam element on the ring is a dimple cooperating with the cam surface.

In accordance with yet another aspect of the present invention, the case assembly can further comprise cam elements for mounting on the case which have structure for assisting resistance welding of the element to the case.

BRIEF DESCRIPTION OF THE DRAWINGS

A more complete understanding of the invention can be had by referring to the following Detailed Description taken with the accompanying Drawings, wherein.

DETAILED DESCRIPTION

Figure 1:
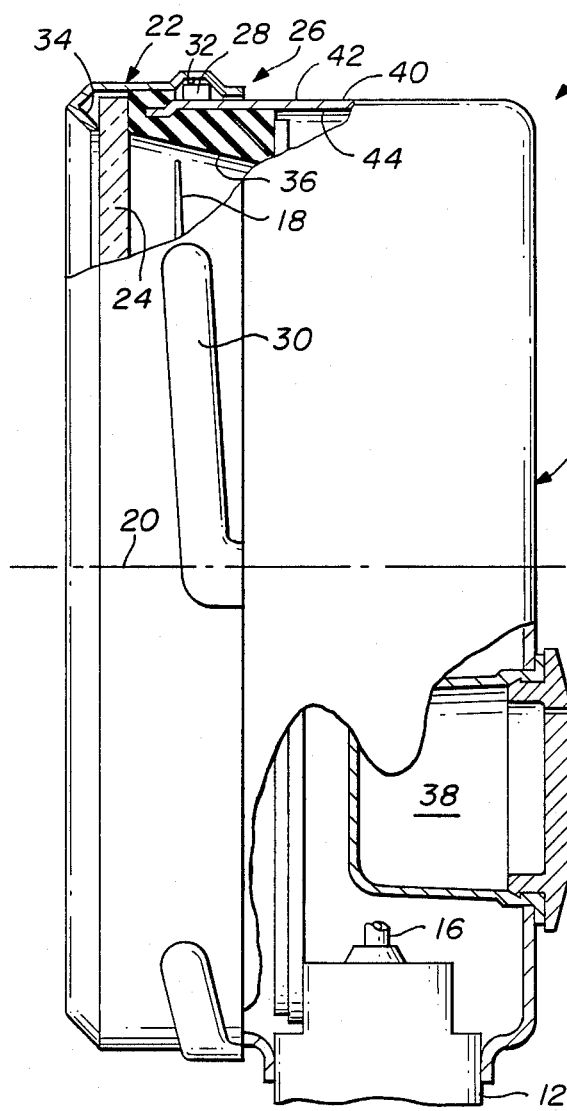
FIG. 1 is a side view in partial cross section of a first embodiment of the present invention with a bayonet ring.

Referring now to the drawings, wherein like reference numerals, designate like or corresponding parts throughout several views, and in particular to FIG. 1, there is illustrated a gauge 10 forming a first embodiment of the present invention. The actual elements of the gauge mechanism are not shown as they are conventional and do not form a part of the present invention. However, the condition to be measured, whether it be fluid temperature, pressure or some other value, is connected to the internal gauge mechanism through a connection 12 passing through the sidewall of the open front case 14. Line 16 extends from the connection 12 inside the case 14 to the gauge mechanism, such as a bourden tube or the like. An indicator 18 is mounted on the gauge mechanism, typically for rotation about the central axis 20 of the gauge to an angular position representative of the value measured by the gauge, whether it be pressure, temperature or some other condition.

A bayonet ring 22 is mounted on the front of the case 14 and supports a gauge glass 24 which protects the indicator while permitting the position of the indicator to be seen through the glass. The bayonet ring 22 is mounted on the case 14 through a cam structure 26. The cam structure includes a number of cam followers 28 secured on the exterior surface of the case 14 and embossments 30 on the bayonet ring 22 which define cam surfaces 32. The bayonet ring 22 also has a lip 34 which engages the outside of glass 24 near its outer edge. An annular seal 36 is received over a pulled in lip 37 of case 14 and bears against the back of the glass 24 near its outer edge. By positioning the ring on the case with the followers in the embossments 30, and rotating the ring about the center line 20 relative to the case, the cam surfaces engage the followers to securely fasten the ring, glass and seal onto the case. If desired, the seal can be made fluid tight to isolate the internal components of the gauge from the environment. If the gauge is fluid tight, it can be filled with a fluid and a pressure equalizer 38 employed to maintain the internal pressure of the gauge roughly equal to the external pressure to reduce leakage into the gauge.

Figure 5:
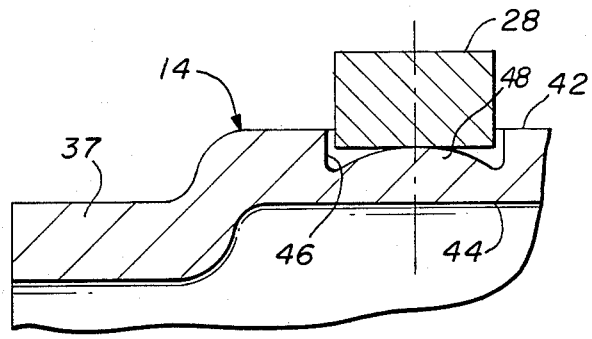
FIGS. 5 and 6 illustrate the use of a hot spot on the case to assist in welding a cam follower thereto.
Figure 6:
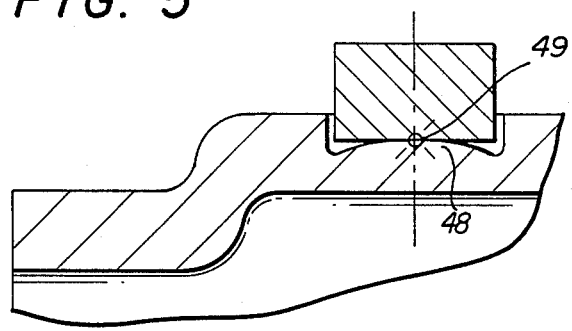

With reference now to FIG. 5–8, as well as FIG. 1, the construction of the open case 14 will be described. Case 14 defines a cylinder with a closed end, including a cylindrical portion 40 which defines a cylindrical exterior surface 42 and a cylindrical interior surface 44. As best seen in FIGS. 5 and 6, the cylindrical exterior surface 42 can have a series of pockets 46 formed into the surface at precise locations axially along the center line 20 and circumferentially around the cylindrical exterior surface. These pockets 46 are designed to orient and receive the cam followers 28. In one construction, the cam followers 28 are resistance welded to the case and a hot spot 48 can be formed in pocket 46 to concentrate the welding current to form an effective weld 49 as seen in FIG. 6.

A significant advantage in the design of the present invention is that a case, such as open front case 14, can also be employed with sliding friction fit rings. Examples of such rings include an elastomeric ring such as ring 50 illustrated in FIG. 3 and a plastic push in window as window 150 illustrated in FIG. 15 where the transparent window and friction fit ring are an integral piece.

Figure 3:
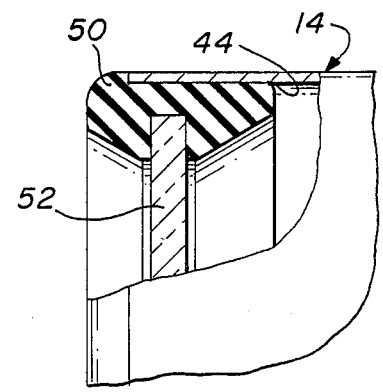
FIG. 3 is a partial cross sectional view of a second modification for use with an elastomeric ring.
Figure 15:
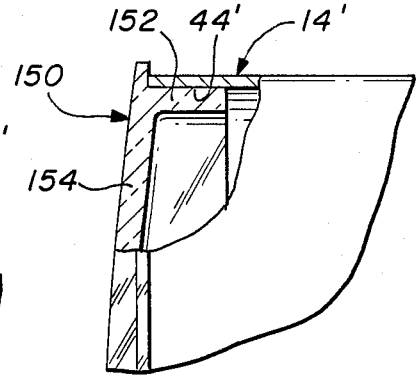
FIG. 15 is a cross sectional view of a case having a plastic push-in window.

The case 14 as shown in FIG. 3 is in all respects identical to the case 14 of FIG. 1 (with the exception of the pulled in lip 37, which is optional.) As can be seen in FIG. 3, the interior surface 44 of the case 14 receives the outer surface of the annular elastomeric ring 50. An annular notch in the elastomeric ring 50, in turn, secures the gauge glass 52. When case 14 is used with an elastomeric ring, no cam followers 28 need be attached to the case and the pockets 46, while present, serve no function. The case 14' in FIG. 15 is functionally equivalent to case 14. The interior surface 44' receives the ring portion 152 of the push in window 150. The transparent portion 154 of window 150 allows the indicator to be seen. Therefore, it can be seen that the case 14 can be readily adapted for use with either a bayonet ring, an elastomeric ring or a push in window with integral ring, reducing the inventory requirements of manufacturers and suppliers and providing a significant commercial advantage as a result.

Figure 2:
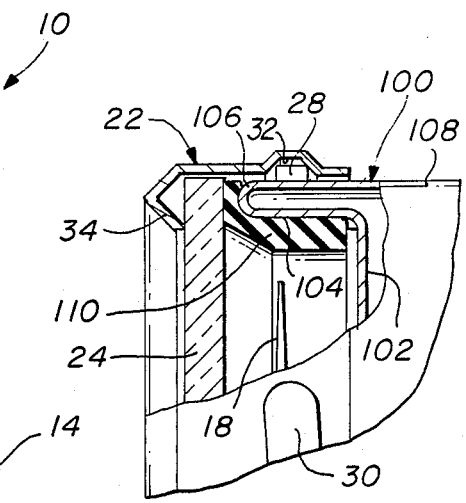
FIG. 2 is a partial cross sectional view of a first modification.
Figure 4:
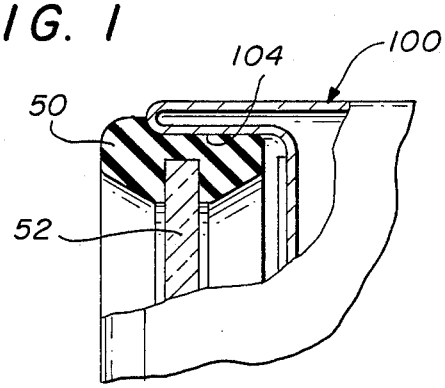
FIG. 4 is a partial cross sectional view of a third modification.

The advantages of the present invention can also be used with a solid front case, as illustrated in FIGS. 2 and 4. In FIG. 2, the solid front case 100 is constructed as case 14 but includes a front 102 which turns over the indicator to define the cylindrical interior surface 104 and then about an annular 180° bend 106 to merge into the cylindrical portion of the case defining the cylindrical exterior surface 108. The cylindrical exterior surface 108 can have pockets 46 for receiving and aligning the followers 28. The bayonet ring 22 has cam surfaces 32 cooperating with the followers 28 to secure the bayonet ring 22, gauge glass 24 and annular seal 110 onto the case 100.

With reference to FIG. 4, the solid front case 100 is employed with the elastomeric ring 50 which bears against the cylindrical interior surface 104 and holds the gauge glass 52 in place.

Figure 7:
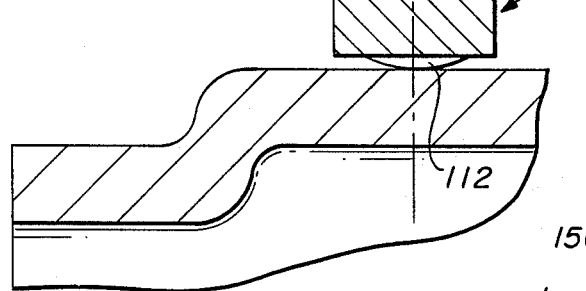
FIGS. 7 and 8 illustrate the use of a protrusion on a cam follower to assist in welding the follower to the case.
Figure 8:
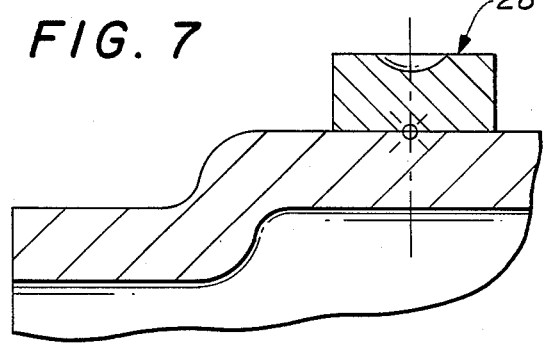

With reference now to FIGS. 7 and 8, an alternative technique for positioning cam followers on a case is illustrated. The cam followers 28' have a projection 112 which serves as a mechanism to concentrate welding energy at the point of welding. This projection 112 serves a similar purpose to the hot spot 48 illustrated in FIGS. 5 and 6. As shown in FIGS. 7 and 8, no pocket 46 needs to be formed in the exterior surface of the case, but if such a pocket is not provided, other techniques for accurately positioning the followers on the case should be employed.

Figure 9:
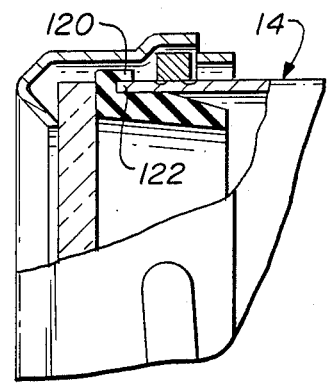
FIG. 9 is a partial cross sectional view of a fourth modification.
Figure 10:
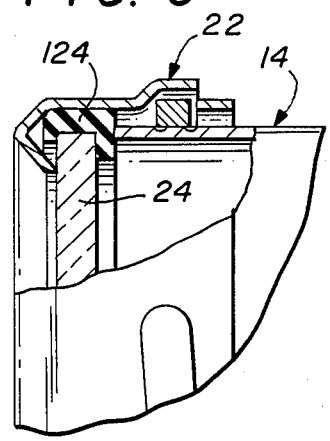
FIG. 10 is a partial cross sectional view of a fifth modification.

FIGS. 9 and 10 illustrate further modifications of the case 10 illustrated in FIG. 1. In FIG. 9, the folded in lip 37 is eliminated and an annular seal 120 is employed to seal between the gauge glass and case which surrounds the edge 122 of the case. In FIG. 10, the folded in lip 37 has also been eliminated, but an annular seal 124 is received about the outer edge of the gauge glass. Seal 124 seals between the side of the gauge glass facing the case and the edge 122 and is compressed between the bayonet ring 22 and the case 14 to provide a seal.

Figure 11:
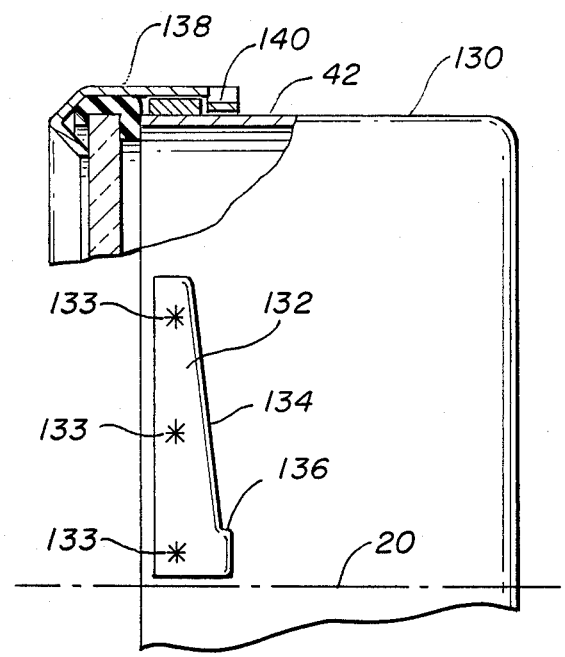
FIG. 11 is a partial cross sectional view of a second embodiment of the present invention.
Figure 12:
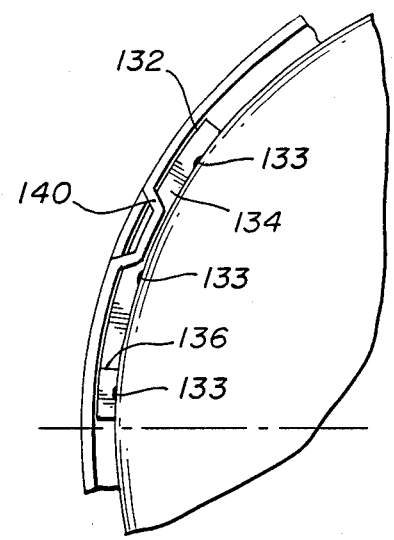
FIG. 12 is a partial end view in cross section of the second embodiment of FIG. 11.

With reference now to FIGS. 11–14, a second embodiment of the present invention is illustrated. In the second embodiment, the cam followers are formed on the bayonet ring, while structures defining the cam surfaces cooperating with the cam followers are secured on the case itself. For example, FIGS. 11 and 12 illustrate an open front case 130 which is very similar to case 14. However, case 130 is adapted to receive curved strips 132 on its cylindrical exterior surface. As can best be seen in FIG. 12, the curved strips 132 are curved to conform in radius with the cylindrical exterior surface 42 of the case so that they can be effectively welded or otherwise mounted to the case as by welding points 133. The curved strips 132 define cam surfaces 134 and cam stops 136. The bayonet ring 138 has a radially inwardly directed follower 140 to cooperate with each curved strip 32. The follower 140 can be a simple lancing in the material of the bayonet ring, for example. When the bayonet ring 138 is mounted on the case 130 and rotated about the central axis 20, the followers 140 will ride up the cam surface 134 until the ring is tightly secured on the case.

Figure 13:
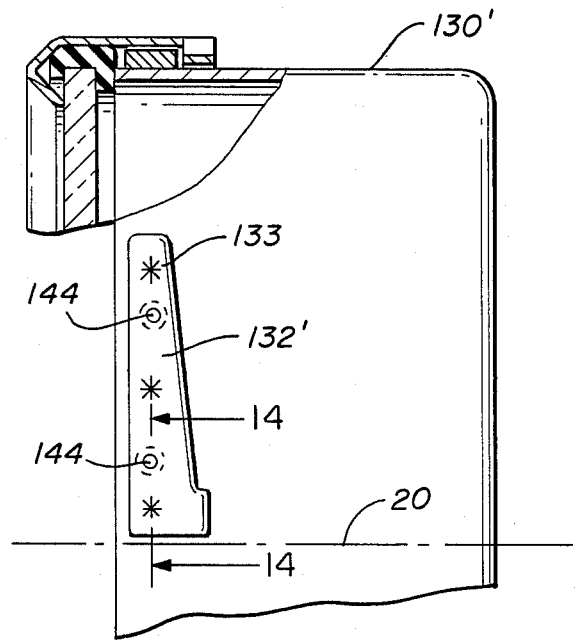
FIG. 13 is a partial cross sectional view of a first modification of the embodiment of FIG. 11.
Figure 14:
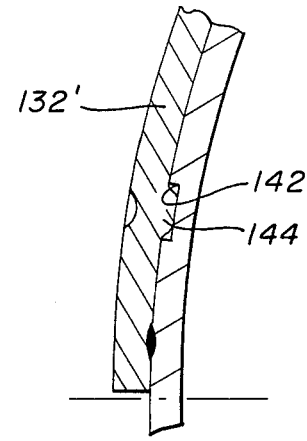
FIG. 14 illustrates the pocket on the case for positioning the cam element.

The case 130' illustrated in FIGS. 13 and 14 is slightly modified from the case 130 illustrated in FIGS. 11 and 12. More specifically, the case 130' has one or more pockets 142 designed to receive projections 144 on the radially inner side of each curved strip 132' to align the strips both axially and circumferentially on the case.

While several embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

We claim:

1. A case assembly for a gauge, the gauge having an indicator, a front cover mounted on the case assembly including a transparent material to protect the indicator and allow the indicator to be observed, the front cover selectively having a bayonet ring or a friction fit ring for mounting the front cover on the case assembly, comprising:

a case having an interior for receiving the gauge and defining a cylindrical exterior ring mounting surface and an interior ring mounting surface, the exterior ring mounting surface having means for mounting bayonet ring receiving structures on said exterior ring mounting surface for receiving a bayonet ring, the interior ring mounting surface for receiving a friction fit ring, the case thereby being used with either type of ring.

2. The case assembly of claim 1 wherein the case has an open front.

3. The case assembly of claim 1 wherein said case has a solid front.

4. The case assembly of claim 1 wherein said mounting means includes means at the exterior ring mounting surface to orient cam elements both axially along a center line of the case exterior ring mounting surface and circumferentially about the case exterior ring mounting surface to receive a cooperating cam element on a bayonet ring.

5. The case assembly of claim 4 wherein said cam elements on said case are cam followers and the cam elements on said bayonet ring are embossments defining cam surfaces.

6. The case assembly of claim 4 wherein the cam elements on said case are curved strips defining cam surfaces and said cam elements on said bayonet ring define cam followers.

7. The case assembly of claim 4 wherein said means for orienting cam elements on the case comprise pockets.

8. The case assembly of claim 7 wherein said pockets include a hot spot for resistance welding of the cam elements to the case.

9. The case assembly of claim 1 wherein said case has a pulled in lip for receiving a seal.

10. A case assembly for a gauge, the gauge having an indicator, a front cover mounted in the case assembly including a transparent material to protect the indicator and allow the indicator to be observed, the front cover selectively having a bayonet ring or a friction fit ring for mounting the front cover on the case assembly, comprising:

a case having an interior for receiving the gauge and defining a cylindrical exterior ring mounting surface and an interior ring mounting surface, the case having means at the exterior ring mounting surface to orient at least two cam elements both axially along a center line of the cylindrical exterior ring mounting surface and circumferentially about the cylindrical exterior ring mounting surface to receive cooperating cam elements on a bayonet ring, the interior ring mounting surface for receiving an elastomeric ring, the case thereby being used to mount either type of ring.

11. The case assembly of claim 10 wherein said orienting means comprises pockets formed into the cylindrical exterior ring mounting surface.

12. The case assembly of claim 11 wherein said cam elements oriented on said case comprise cam followers.

13. The case assembly of claim 11 wherein said cam elements oriented on said case comprise strips curved on their radially inner surface to the curvature of the exterior ring mounting surface and having radially inwardly directed projections for being received in the pockets to align the strip on the case, said strip having a cam surface, the cam element on said bayonet ring being a cam follower for riding up the cam surface to secure the bayonet ring on the case.

* * * * *